United States Patent [19]

Gneupel

[11] 4,159,971

[45] Jul. 3, 1979

[54] OZONE GENERATOR

[76] Inventor: Arthur Gneupel, Bitziberg 5, Bachenbulach, Switzerland

[21] Appl. No.: 764,219

[22] Filed: Jan. 31, 1977

[30] Foreign Application Priority Data

Feb. 19, 1976 [DE] Fed. Rep. of Germany ....... 2606731
Aug. 2, 1976 [DE] Fed. Rep. of Germany ....... 2634720

[51] Int. Cl.² ............................................. C01B 13/11
[52] U.S. Cl. ................................. 250/540; 250/539
[58] Field of Search .................... 250/539, 540, 532

[56] References Cited

U.S. PATENT DOCUMENTS

| 1,074,462 | 9/1913 | Richards | 250/539 |
| 1,157,859 | 10/1915 | Freet | 250/540 |
| 1,505,669 | 8/1924 | Quain | 250/539 |
| 1,803,600 | 5/1931 | Daily | 250/541 |
| 3,214,364 | 10/1965 | Van Tuyle et al. | 250/540 |
| 3,766,051 | 10/1973 | Bollyky | 250/540 |
| 4,035,657 | 7/1977 | Carlson | 250/539 |

*Primary Examiner*—Benjamin R. Padgett
*Assistant Examiner*—Deborah L. Kyle
*Attorney, Agent, or Firm*—O'Brien and Marks

[57] ABSTRACT

A substantially tubular-shaped ozone generator embodying an inner electrode, a coaxial outer electrode surrounding the inner electrode and a tube member formed of dielectric material arranged between the inner electrode and the outer electrode. Within the tube member formed of dielectric material there is arranged a substantially cylindrical core provided at its outer surface with one or a number of substantially helically-shaped grooves extending in the axial direction of the core and forming a throughpass channel for the medium to be ozonized and the ozone which is generated.

26 Claims, 4 Drawing Figures

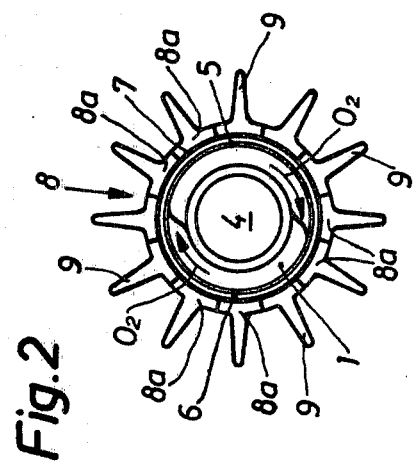
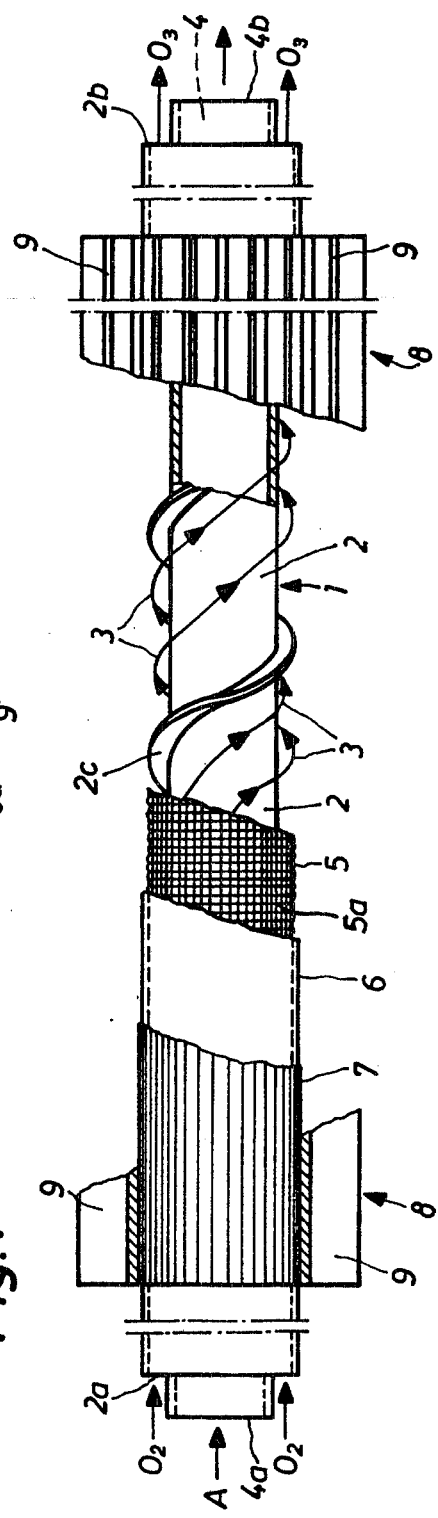

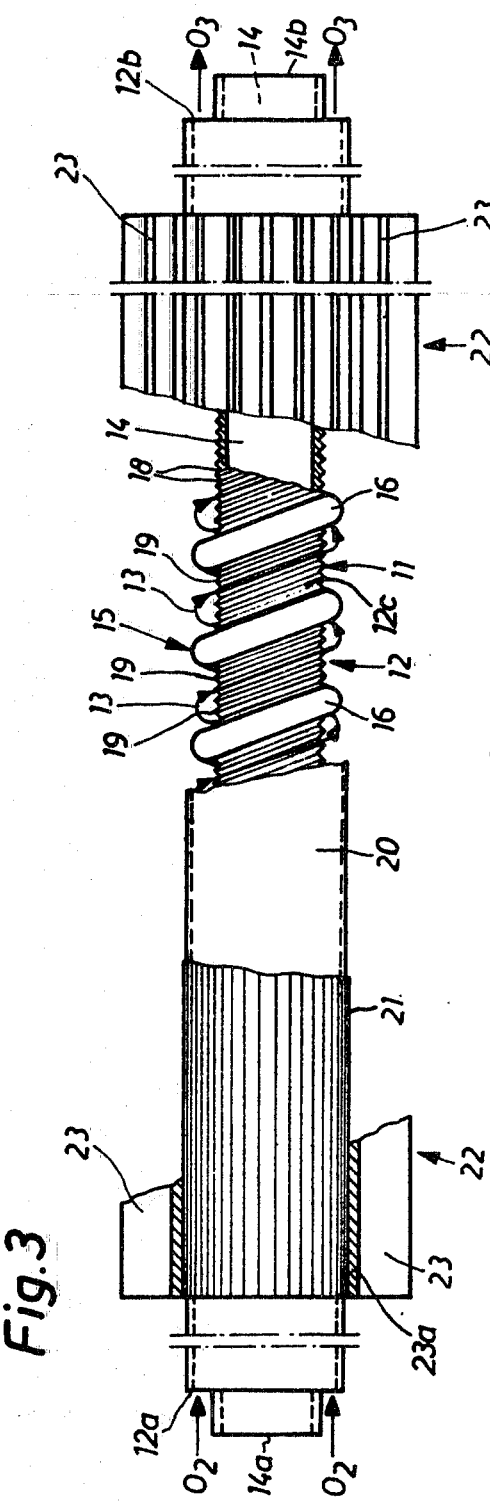
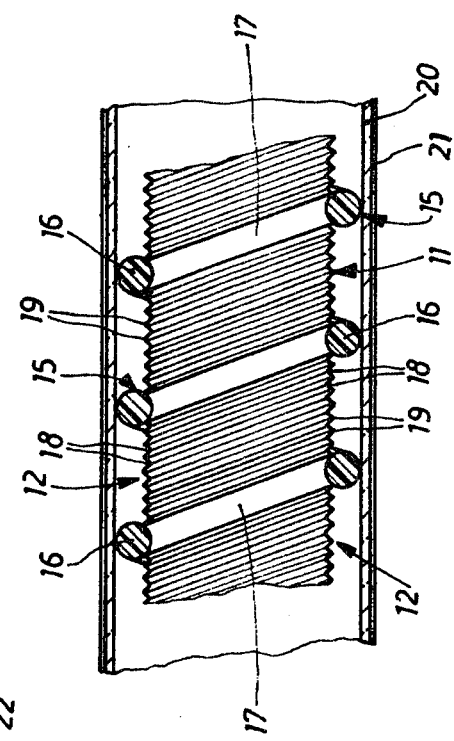
Fig. 3
Fig. 4

OZONE GENERATOR

BACKGROUND OF THE INVENTION

The present invention relates to a new and improved construction of a substantially tubular-shaped ozone generator which is of the type comprising an inner electrode, a coaxial outer electrode surrounding such inner electrode, and a tubular member formed of dielectric material arranged between the inner electrode and the outer electrode.

Such type ozone generators which work with quiet discharges are known to the art. Yet these heretofore known ozonizers either have insufficient ozone yield or possess a complicated construction and require a great deal of space.

SUMMARY OF THE INVENTION

Hence, it is a primary object of the present invention to provide an improved construction of an ozone generator which is not associated with the aforementioned drawbacks and limitations of the prior art constructions.

Another and more specific object of the present invention aims at the provision of a new and improved ozone generator of the previously mentioned type which produces a large quantity of ozone in an economical fashion.

Now in order to implement these and still further objects of the present invention, which will become more readily apparent as the description proceeds, the inventive ozone generator is manifested by the features that within the tubular member formed of dielectric material there is arranged a substantially cylindrical core which is provided at its outer surface with one or a number of substantially helically-shaped grooves extending in the axial direction of the core, these grooves providing a throughpass channel for the medium which is to be ozonized and the ozone which is produced.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 illustrates partially in sectional view a first exemplary embodiment of an ozone generator constructed according to the present invention;

FIG. 2 is a view of the ozone generator shown in FIG. 1, looking in the direction of the arrow A;

FIG. 3 illustrates a second exemplary embodiment of ozone generator partially in sectional view; and FIG. 4 is a longitudinal sectional view through part of the ozone generator depicted in FIG. 3 but without the outer shell or jacket.

DETAILED DESCRIPTION OF THE PREFERRED EMBODIMENTS

Describing now the drawings, the ozone generator or ozonizer illustrated by way of example in FIGS. 1 and 2 will be seen to comprise a substantially hollow cylindrical core 1 which is resistant to ozone. The core 1 is preferably formed of aluminum and is provided at its outer surface with an electrically non-conductive layer produced for instance by means of an ematal-process. The core 1 is further equipped at its outer surface with at least one groove 2 extending in a substantially helically-shaped configuration along its lengthwise axis. This helically-shaped groove 2 is formed by a helical winding or helix 2c and has an inlet 2a and an outlet 2b and forms a throughpass or throughpassage channel 2c for the medium which is to be ozonized e.g. air or oxygen and the ozone which is formed. The path of movement of the medium flowing through the groove 2 has been schematically indicated by reference character 3 in FIG. 1. It is also possible to provide, as mentioned, a plurality of such helically-shaped grooves 2.

The depth and width of the groove or grooves 2 can be randomly selected and therefore designed for an optimum ozone yield.

Internally of the core 1 there is formed a cooling channel 4 having an inlet opening 4a and an outlet opening 4b, through which channel there can be caused to flow, if needed, a cooling medium, for instance air or water.

Around the core 1 there is arranged an inner electrode 5 which is formed of a fine mesh metal grid resistant to ozone. The electrode grid 5 possesses an electrically non-conductive outer layer, generally indicated by reference character 5a. The electrode grid 5 is preferably formed of aluminum, and the aforementioned outer layer can be produced by means of an ematal-process.

By means of the core 1 the electrode grid 5 is mechanically reinforced and calibrated and pressed against a tube or tubular member 6 formed of a suitable dielectric material which surrounds the electrode grid 5. This tubular member or tube 6 is preferably a glass tube or pipe.

About the tubular member 6 there is arranged the outer electrode 7 preferably consisting of a metallic foil. This metallic foil 7 is surrounded by an outer jacket or shell 8 having radially protruding cooling fins or ribs 9 extending in axial direction. The shell or jacket 8 is formed from individually joined elements 8a which extend in axial direction and are located next to one another, as best seen by referring to FIG. 2. Each of these elements 8a carries a cooling rib or fin 9. The elements 8a are held together for instance by not particularly illustrated conventional clamping elements, for instance metallic wires, so that the metallic foil 7 is uniformly pressed against the tubular member 6. The outer jacket or shell 8 including the cooling ribs or fins 9 are preferably formed from aluminum.

Continuing, a not particularly illustrated conventional voltage source is electrically connected with the inner electrode 5 and the outer electrode 7, and specifically either directly or by means of the core 1 and the outer jacket or shell 8 respectively. The production of ozone is accomplished in standard fashion by means of a corona discharge which appears at the medium flowing through the groove 2.

The illustrated construction allows for a uniform spacing of the electrodes 5 and 7, which is extremely important for proper operation of the device. If, for instance, the spacing between these electrodes is irregular, then in the case of a number of parallel conected ozone generators or ozonizers the individual ozonizers will be irregularly loaded, impairing the intensity of the corona discharge.

With respect to the exemplary embodiment of ozonizer or ozone generator as shown in FIGS. 3 and 4, it will be seen that the same likewise comprises a core 11 which is resistant to ozone. This core 11 serves as the inner electrode and is formed of electrically conductive material.

Core 11 is provided at its outer surface with at least one substantially helically-shaped groove 12 extending along the lengthwise axis of the core and having an inlet 12a and an outlet 12b. Grove 12 forms a throughpass channel 12c for the medium which is to be ozonized, for instance air or oxygen and the ozone which is formed. The path of movement of the medium flowing through the groove 12 has been indicated in FIG. 3 by reference character 13. Again, it is here mentioned that it is also possible to provide a number of such helically-shaped grooves 12.

The depth and width of the groove or grooves 12, also for this embodiment, can be randomly selected and therefore designed for optimum ozone yield.

Internally of the core 11 there is formed a cooling channel 14 having an inlet opening 14a and an outlet opening 14b, through which cooling channel, when necessary, there can flow a cooling medium, for instance air or water.

The lateral boundary wall 15 of the groove 12 consists of an electrically non-conductive, ozone resistant material, for instance plastic. With the illustrated embodiment this boundary wall 15 is formed by a strand 16 formed of plastic, for instance soft-PVC (polyvinyl Chloride), of substantially circular cross-section. The strand 16 can also exhibit a different cross-sectional shape and/or can be constructed as a hose having an internal throughpassage opening.

This strand 16 extends in a substantially helically-shaped configuration along the core 11 and is inserted into a helically-shaped recess 17 provided at such core 11 (FIG. 4). Strand 16 is held in place in any suitable manner within such recess 17. When there is used more than a single groove 12 then a corresponding number of strands 16 is needed.

At the outer side or surface forming the base of the groove 12 there are provided thread-like notches or indentations 18 extending in a substantially helical-shaped configuration, by means of which there are formed pointed raised portions or protuberances 18 functioning as discharge tips. The raised portions 19 located at the base of the groove 12 also can be formed in another suitable manner.

Around the core 11 there is arranged a coaxial tube or tubular member 20 formed of dielectric material, preferably a glass tube or pipe. The boundary wall 15 i.e. the plastic strand 16 bears against the inner surface of the tube 20, so that the flowing medium cannot penetrate between the strand 16 and the tube 20.

An outer electrode 21 is arranged around the tube or tubular member 20, this outer electrode 21 preferably consisting of a metallic foil. Similar to the arrangement of FIGS. 1 and 2, this metallic foil 21 is surrounded by an outer jacket or shell 22 which is partially visible in FIG. 3 but has been omitted in FIG. 4. This outer jacket 22 possesses radial protruding cooling ribs or fins 23 which extend in axial direction. The jacket or shell 22 is formed by individual elements 23a which are appropriately joined together, extend in axial direction and are located next to one another, as best seen by referring to FIG. 2. Each of these elements 23a carries a cooling rib or fin 23. The elements 23a are held together by any suitable and therefore not particularly illustrated tensioning or clamping members, for instance metallic wires, so that the metallic foil 21 can be uniformly pressed against the tube 20. The outer jacket 22 together with its cooling ribs or fins 23 is preferably formed of aluminum.

A not particularly illustrated suitable voltage source is electrically connected with the core 11 serving as the inner electrode and the outer electrode 21 or the outer jacket or shell 22. Generation of ozone is carried out in conventional manner at the medium flowing through the groove or grooves 12, by a corona discharge occurring between the core 11 and the outer electrode 21. The pointed raised portions 19 at the base of the grooves 12 advantageously act upon the corona discharge (producing uniform discharges).

The medium which is to be ozonized, for both of the exemplary embodiments, is preferably forced under high pressure through the grooves 2 and 12 respectively. Compressed air is advantageously employed as the medium which is to be ozonized. Owing to the high corona intensity the ozone generator also is not operationally impaired when using a medium which is not completely pre-dried since there is prevented the formation of an arc.

Due to the helically-shaped path of movement 3 and 13, respectively, of the medium to be ozonized such remains within the ozone generator, for a given structural length thereof, for a greater period of time than in the case of linearly extending paths of movement. Consequently, it is possible, even with greater velocity of the throughflowing medium, to produce a large quantity of ozone.

The developed heat which is undesired for the production of the ozone is withdrawn by means of the cooling ribs or fins 9 and 23 at the outer shell or jacket 8 and 22 respectively. An additional withdrawal of heat is realized by means of the cooling medium flowing through the cooling channels 4 and 14 of the cores 1 and 11 respectively.

The described ozone generators can operate at high pressures and with small energy consumption and, among other things, are especially suitable for use in water purification installations of the most different types.

These ozone generators can be operated at a voltage having the normal network frequency of 50 Hz or 60 Hz and the applied voltage can amount to for example between 8 and 20 kV.

While there are shown and described present preferred embodiments of the invention, it is to be distinctly understood that the invention is not limited thereto, but may be otherwise variously embodied and practiced within the scope of the following claims. Accordingly,

What is claimed is:

1. A substantially tubular-shaped ozone generator comprising:
    an inner electrode of substantially hollow cylindrical configuration, said inner electrode consisting of a metallic grid,
    an outer electrode coaxially arranged to and surrounding said inner electrode,
    a tubular member formed of dielectric material arranged between said inner electrode and said outer electrode, said tubular member being in contact with said outer electrode,
    a substantially cylindrical core arranged within said inner electrode and surrounded by said inner electrode, and
    helix means extending around said core throughout the length of said core, said helix means also extending from the outer surface of said core and pressing said inner electrode against said tubular member, said helix means defining at least one substantially helically-shaped groove extending substantially in the axial direction of said core, and said at least one groove providing the only throughpass channel for a medium to be ozonized and the ozone which is formed.

2. The ozone generator as defined in claim 1 wherein said inner electrode comprises a fine-mesh grid and is provided with an electrically non-conductive outer layer resistant to ozone.

3. The ozone generator as defined in claim 2 wherein: said inner electrode is formed of aluminum.

4. The ozone generator as defined in claim 1 wherein: said core is formed of metal and possesses an outer layer which is resistant to ozone.

5. The ozone generator as defined in claim 4 wherein: the core is formed of aluminum.

6. The ozone generator as defined in claim 1 wherein: said core possesses a substantially hollow cylindrical construction and is equipped internally thereof with cooling channel means for the through flow of a cooling medium.

7. The ozone generator as defined in claim 1 wherein: said tubular member formed of dielectric material is a glass tube.

8. The ozone generator as defined in claim 1 wherein the outer electrode is formed of a metallic foil, and wherein there is provided a substantially hollow cylindrical outer shell, said outer electrode being fixedly retained between said tubular member and said hollow cylindrical outer shell.

9. The ozone generator as defined in claim 8 wherein: said outer shell is formed of metal and is provided with radially protruding and axially extending cooling fins.

10. The ozone generator as defined in claim 9 wherein: said outer shell is formed of aluminum.

11. The ozone generator as defined in claim 8 wherein: said outer shell comprises a plurality of adjacently situated individual elements which extend in axial direction and which are held together.

12. A substantially tubular-shaped ozone generator comprising:
an inner electrode,
an outer electrode coaxially arranged to and surrounding said inner electrode,
a tubular member formed of dielectric material arranged between said inner electrode and said outer electrode,
said tubular member being in contact with said outer electrode,
said inner electrode being formed of a substantially cylindrical core arranged within and surrounded by said tubular member,
helix means extending around said core from the outer surface of said core and against the inner surface of said tubular member,
said helix means extending around said core throughout the length of said core and defining at least one substantially helically-shaped groove extending substantially in the axial direction of said core, and
said at least one groove providing the only throughpass channel for a medium to be ozonized and the ozone which is formed.

13. The ozone generator as defined in claim 12 wherein: said helix means includes lateral boundary wall means formed of an electrically non-conductive material.

14. The ozone generator as defined in claim 13 wherein: said boundary wall means is formed of plastic.

15. The ozone generator as defined in claim 13 wherein said boundary wall means is formed of at least one strand which extends in a substantially helical-shaped configuration along the outer surface of the core.

16. The ozone generator as defined in claim 15 wherein: the outer surface of said core is provided with a substantially helically-shaped recess, said strand being arranged in said helically-shaped recess of said core.

17. The ozone generator as defined in claim 12 wherein: said core has pointed raised portions in said at least one groove.

18. The ozone generator as defined in claim 17 wherein: said raised portions are defined by substantially threadlike indentations provided at the outer surface of the core.

19. The ozone generator as defined in claim 12 wherein: said core is formed of metal and possesses an outer layer which is resistant to ozone.

20. The ozone generator as defined in claim 19 wherein: the core is formed of aluminum.

21. The ozone generator as defined in claim 12 wherein: said core possesses a substantially hollow cylindrical construction and is equipped internally thereof with cooling channel means for the throughflow of a cooling medium.

22. The ozone generator as defined in claim 12 wherein: said tubular member formed of dielectric material is a glass tube.

23. The ozone generator as defined in claim 12 wherein: the outer electrode comprises a metallic foil, and wherein there is provided a substantially hollow cylindrical outer shell, said outer electrode being fixedly retained between said tubular member and said hollow cylindrical outer shell.

24. The ozone generator as defined in claim 23 wherein: said outer shell is formed of metal and is provided with radially protruding and axially extending cooling fins.

25. The ozone generator as defined in claim 24 wherein: said outer shell is formed of aluminum.

26. The ozone generator as defined in claim 24 wherein said outer shell comprises a plurality of adjacently situated individual elements which extend in axial directions and which are held together.

* * * * *